(12) United States Patent
Lorteije et al.

(10) Patent No.: US 6,740,691 B1
(45) Date of Patent: May 25, 2004

(54) REMOVAL OF VOLATILE ORGANIC COMPOUNDS FROM POLYMER DISPERSIONS

(75) Inventors: Johanna Maria Sophia Lorteije, Maastricht (NL); Markus Aurelius Von Arx, Nottwil (CH); Rolf Studer, Zofingen (CH); Petrus Leonardus Swinkels, Gulpen (NL)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 10/019,136

(22) PCT Filed: Jun. 16, 2000

(86) PCT No.: PCT/EP00/05529
§ 371 (c)(1),
(2), (4) Date: Sep. 10, 2002

(87) PCT Pub. No.: WO00/78822
PCT Pub. Date: Dec. 28, 2000

(51) Int. Cl.[7] .................................................. C08J 3/00
(52) U.S. Cl. ...................... 523/328; 523/326; 524/560; 524/561; 524/562; 524/564; 528/500
(58) Field of Search ................................ 523/328, 326; 524/560, 561, 562, 564; 528/500

(56) References Cited

U.S. PATENT DOCUMENTS

| | | | | | |
|---|---|---|---|---|---|
| 2,344,843 | A | * | 3/1944 | Wellman | 524/828 |
| 3,054,762 | A | * | 9/1962 | Rees | 524/733 |
| 3,196,130 | A | * | 7/1965 | Goltner et al. | 526/200 |
| 3,457,230 | A | * | 7/1969 | Kekish | 526/207 |
| 3,534,009 | A | | 10/1970 | Beresniewicz | 526/73 |
| 3,652,525 | A | * | 3/1972 | Nakamura et al. | 526/73 |
| 3,692,726 | A | * | 9/1972 | Oehmichen | 524/189 |
| 3,714,100 | A | * | 1/1973 | Biale et al. | 524/748 |
| 3,806,402 | A | * | 4/1974 | Stehle et al. | 428/514 |
| 3,832,317 | A | * | 8/1974 | Mikofalvy et al. | 524/805 |
| 4,062,662 | A | | 12/1977 | Kuxdorf et al. | 55/206 |
| 5,376,703 | A | | 12/1994 | Noelken et al. | 523/328 |
| 5,430,127 | A | | 7/1995 | Kelly | 528/500 |
| 5,451,644 | A | * | 9/1995 | Fiarman et al. | 526/93 |
| 5,886,140 | A | | 3/1999 | Olivares et al. | 528/485 |

FOREIGN PATENT DOCUMENTS

| | | | |
|---|---|---|---|
| CA | 1332485 | 2/1989 | C09D/5/02 |
| CA | 2062656 | 3/1992 | C08F/6/16 |
| DE | 198 59 249 A1 | 12/1998 | C08F/6/10 |
| EP | 0 650 977 A1 | 3/1995 | C08F/6/00 |
| WO | WO 97/45184 | 12/1997 | |
| WO | WO 99/14248 | 3/1999 | |

* cited by examiner

*Primary Examiner*—Judy M. Reddick
(74) *Attorney, Agent, or Firm*—Thomas F. Roland; Charles W. Almer

(57) ABSTRACT

A process for treating an aqueous polymer latex/dispersion of synthetic polymers prepared by polymerizing one or more monomeric materials for at least 80%, involving:

A. adding to the polymer latex/dispersion a sufficient amount of at least one reducing agent in one or more portions followed by adding at least one free radical generator in such a way that at least the bulk of the reducing agent has been added before addition of free radical generator is started and maintaining the mixture at a suitable temperature for a period of time which is sufficient to reduce the VOC-level of the latex/dispersion to decrease to below 1,500 ppm, preferably to below 1,000 ppm after which B. water vapor and/or gas is/are sparged into the latex/dispersion while the temperature of the latex/dispersion is maintained at a suitable temperature for a period of time which is sufficient to decrease the VOC-level to below 200 ppm, preferably to below 50 ppm, most preferably to below 15 ppm.

17 Claims, No Drawings

REMOVAL OF VOLATILE ORGANIC COMPOUNDS FROM POLYMER DISPERSIONS

BACKGROUND OF THE INVENTION

The invention relates to the removal of volatile organic compounds from latices/dispersions of synthetic polymers.

The terms latices/dispersions as used herein are also meant to cover emulsions and suspensions.

Latices/dispersions of synthetic polymers are usually prepared by polymerizing unsaturated monomeric materials in a liquid medium, usually water, under the influence of free radicals and at the end of the polymerization stage the latices/dispersions typically contain volatile organic compounds which result from incomplete conversion of monomers, impurities of raw materials and undesirable by-products formed during the polymerization reaction. The presence of these volatile organic compounds (VOC) i.e. having a boiling point below 213.5° C. (boiling point of 2-ethylhexyl acrylate) at atmospheric pressure (101.325 kPa) in latices/dispersions of synthetic polymers is undesirable for various reasons and therefore various processes have been developed to remove these compounds. There is still a need for an efficient process to minimize the volatile organic compound (VOC) content of latices/dispersions of synthetic polymers. Especially for such a process which is friendly from an environmental point of view by increasing the yield of polymeric materials to a maximum and decreasing the amount of residual monomer and other volatiles in combination with low energy consumption.

The prior art discloses several methods.

A. Venting the reaction vessel in which the latex or dispersion has been manufactured. This process helps especially in cases where very volatile monomeric materials like e.g. ethylene are polymerized. Cf e.g. U.S. Pat. No. 3,534,009, in the Example.
B. Post-polymerization i.e. adding fresh radical generating materials after the main polymerization to polymerize residual monomeric material further. Cf e.g. U.S. Pat. No. 3,534,009 and EP Appl. 158,523.
C. Sparging air and/or water vapour through the latex/dispersion often called steam stripping is also a well known process, but when carried out in a conventional reactor it is rather time consuming and lowers the throughput of the equipment. Attempts have been made to make steam stripping more efficient e.g. by carrying out the process in special equipment like a degassing column and passing through gas and/or water vapour upwards and the latex/dispersion downwards in countercurrent. Cf e.g. U.S. Pat. No. 4,062,662, EP Appl. 584,458 and WO 97/45,184.
D. Chemical methods like hydrolysing and/or oxidising the residual monomeric materials. Cf e.g. EP Appl. 505,959.

As it is desirable to decrease the VOC level of several percents immediately after polymerization to a few or a fraction of a ppm (part per million) combinations of two or more of the above methods have been developed and disclosed.

One such combination is disclosed in EP Appl. 563,726 and combines chemical oxidation with subsequently distilling off of the residual vinylester and acetaldehyde formed. Another combination is disclosed in EP Appl. 650,977 and involves post polymerization treatment with a free radical generator under polymerization conditions followed by steam stripping under vacuum and results in polymer latices/dispersions containing 5 to 500 ppm of residual monomer and other volatiles. WO 99/14,248 (BASF) discloses the reduction of residual monomer content of e.g. latex by post-polymerization in a reactor having a mixing time which is as short as possible by dosing slowly at least one the components of the redoxinitiator in such a manner that the dosing time is about 10 to 250 times the mixing time of the liquid system in the reactor. It is preferred that the dosing of the oxidizing- and reducing components of the initiator system to the liquid in the reactor is carried out at separate points of addition ("räumlich getrennte Zugabe") such as the reactor lid, reactor bottom or reactor side wall and that the components are dosed simultaneously or one after the other. There are 12 Examples which specify that the oxidizing agent (tert.-butylhydroperoxide) was dosed first and the reducing agent (e.g. sodium disulphite) was dosed subsequently. There is, however, one exception viz. Example 5b which specifies the simultaneous addition of both components. The tenor is that the sequence order of dosing oxidizing agent and reducing agent does not matter, although the examples seem to indicate that there is some preference for first dosing the oxidizing agent and then the reducing agent.

SUMMARY OF THE INVENTION

The present invention relates to an improvement of the process of EP appl. 650,977 and secures one or more of the following advantages: a lower VOC contents in the end-product and/or a higher throughput than with the current processes and/or a lower energy consumption and/or a better endproduct and/or a higher economy of chemicals used.

DETAILED DESCRIPTION OF THE INVENTION

In a first embodiment the invention therefore provides a process for treating an aqueous polymer latex/dispersion prepared by polymerizing one or more monomeric materials for at least 98%, comprising the steps of:

A. adding to the polymer latex/dispersion in a sufficient amount of at least one reducing agent in one or more portions followed by adding at least one free radical generator in such a way that at least the bulk of the reducing agent has been added before addition of free radical generator is started and maintaining the mixture at a suitable temperature for a period of time which is sufficient to reduce the VOC-level of the latex/dispersion to decrease to below 1,100 ppm, preferably to below 500 ppm after which
B. water vapour and/or gas is/are fed into the latex/dispersion whilst the temperature of the latex/dispersion is maintained at a suitable temperature for a period of time which is sufficient to decrease the VOC-level to below 200 ppm, preferably to below 50 ppm, more preferably to below 15 ppm. Typically to 0.5–10 ppm.

In step A, only monomeric VOC's will be reduced by polymerization and formation of polymer, while in step B, all VOC's that are present will be removed, including non-polymerisable VOC's that were present in the monomers or other raw materials, or that were produced during the polymerisation. Therefore the combination of steps A and B is particularly advantageous. This combination has both environmental and economical advantages because step A improves the yield of polymer and reduces the amount of volatile material to be removed in step B by a relatively short thermal treatment under mild conditions resulting in a better endproduct with less volatiles and less polymer degradation.

The aqueous polymer latex/dispersion treated according to the present invention is prepared by polymerizing a mixture of one or more unsaturated monomeric materials in an aqueous medium under the influence of a free radical initiator. Emulsion and suspension polymerization techniques are well-known in the art and are e.g. disclosed in "Emulsion polymerization", D. C. Blackley, Applied Science Publishers, 1974 and "Textbook of Polymer Science", F. W. Billmeyer. Wiley, 1975, Chapter 12, which are incorporated by reference. In these polymerizations preferably a suitable free radical generator system is used. For example, free radical generating compounds, ultraviolet light or radiation can be used. The choice of the free radical generating chemical compound to be used depends on the desired polymerization rate and final polymer properties. Some representative examples of free radical initiators which are commonly used include the various ammonium and alkali metal salts of persulphuric or peracetic acid, such as e.g. ammonium persulphate, sodium persulphate, potassium persulphate, sodium peracetate, peroxides such as e.g. hydrogen peroxide, benzoyl peroxide, tertiarybutyl hydroperoxide, tertiaryamyl hydroperoxide, cumene hydroperoxide, paramenthane hydroperoxide, diisopropylbenzene hydroperoxide or percarbonates such as e.g. bis(4-tertiarybutylcyclohexyl)peroxydicarbonate, tertiarybutyl peroctoate and tertiarybutyl perpivalate and azo compounds such as e.g. azobisisobutyronitrile or 2,2'-azobis(2-amidinopropane) dihydrochloride. These can be used alone, undergoing homolytic cleavage upon heating to yield free radicals, or in conjunction with a reducing agent in a redox couple. Suitable reducing agents include oxidisable sulphur compounds such as alkali metal sulphites, hydrogen sulphites, metabisulphites, dithionites, formaldehyde sulphoxylates or thiosulphates, particularly the sodium salts, ascorbic acid, erythrobic acid and tartaric acid. When a redox couple is used, a suitable compound e.g. salt of a metal which can exist in more than one oxidation state is often included as a co-catalyst or activator. Various transition metal salts can be used, such as e.g. salts of iron, copper or cobalt, but the use of an iron salt, (e.g. ferric chloride or ferrous ammonium sulphate), is preferred. The amount of transition metal is typically up to 30 ppm based on the weight of monomer, preferably up to 20 ppm in either step.

The unsaturated monomeric materials can be diverse and depend on the type of properties desired in the eventual polymeric materials. Frequently used as the main comonomers are vinyl esters of aliphatic carboxylic acids containing 1–20 carbon atoms such as e.g. vinyl acetate, vinyl propionate or vinyl versatate, ethylene, C1–C18 alkyl esters of acrylic acid or methacrylic acid, such as e.g. methyl acrylate, ethyl acrylate, n-butyl acrylate, 2-ethylthexyl acrylate, methyl methacrylate, or n-butyl methacrylate, dialkyl esters and half esters of maleic and fumaric acid containing 1–8 carbon atoms in each alkyl group, such as e.g. dibutyl maleate, vinyl aromatic compounds such as styrene, unsaturated nitriles such as acrylonitrile or methacrylonitrile, less preferably vinyl halide compounds such as vinyl chloride or vinylidene chloride and butadiene.

Optionally other monomers can also be included in lower amounts to impart special properties. These can include unsaturated carboxylic acids, such as e.g. acrylic acid, methacrylic acid, crotonic acid, vinylacetic acid or carboxyethyl acrylate, or dicarboxylic acids such as maleic acid, fumaric acid, itaconic acid, or citraconic acid, hydroxyalkyl acrylates or methacrylates with 1–4 carbon atoms in the alkyl(oxy) group such as e.g. hydroxyethyl acrylate, hydroxypropyl acrylate or hydroxyethyl methacrylate, unsaturated amides such as acrylamide or methacrylamide, ionic monomers such as e.g. 2-acrylamido-2-methylpropanesulphonic acid and its salts, sodium vinyl sulphonate or sodium styrene sulphonate. Polyunsaturated monomers may also be included, such as e.g. vinyl crotonate, allyl acrylate or methacrylate, diallyl maleate or fumarate, divinyl adipate, diallyl adipate, diallyl phthalate, ethylene glycol dimethacrylate, butane diol dimethacrylate, methylene bisacrylamide, triallyl cyanurate and isocyanurate, allyl glycidyl ether or divinyl benzene. Post-polymerisation crosslinking monomers can also be present, such as N-methylol acrylamide, N-methylol methacrylamide, N-methylol allyl carbamate, isobutoxymethyl acrylamide and N-butoxymethyl acrylamide. Preferred are N-methylol acrylamide or a blend of N-methylol acrylamide and acrylamide, available from Cytec Industries Inc, West Paterson, N.J., USA as NMA Special, and silanes such as e.g. vinyl tris(2-methoxyethoxy)silane or vinyl triethoxysilane.

Usually a blend of monomeric materials is used and preferably the blend comprises vinylacetate and a co-monomer. The term monomeric materials also comprises any cross-linking agents present such as e.g. N-methylol acrylamide, N-methylol methacrylamide etc. Preferably the blend of monomeric materials comprise only C, H, O and N atoms, more preferably only C, H and O atoms. In a preferred embodiment of the invention the monomeric materials comprise for at least 50–100%, preferably at least 70% vinylacetate with ethylene and/or acrylate as comonomers or 0–60%, preferably 5–50% styrene with acrylate or methacrylate as comonomer(s) which yield excellent results in the practice of the present invention.

The polymerisation can be carried out using either a batch process, a continuous monomer addition or an incremental monomer addition. The entire amount of the aqueous medium with polymerisation additives can be present in the polymerisation vessel before introduction of the monomers, or alternatively part or all of it can be added continuously or incrementally, either as a separate feed or emulsified with the monomers. A polymer seed can optionally be present, in amounts from 0.1% to 8% by weight on total polymer. The copolymer is generally prepared with an emulsifier and/or a protective colloid which are known in the art. Suitable emulsifiers include anionic, cationic, or nonionic surface active compounds or mixtures thereof. Suitable anionic emulsifiers are, for example, alkyl sulphonates, alkylaryl sulphonates, alkyl sulphates, sulphates of hydroxylalkanols, alkyl and alkylaryl disulphonates, sulphonated fatty acids, sulphates and phosphates of polyethyoxylated alkanols and alkylphenols, as well as esters of sulphosuccinic acid. Suitable cationic emulsifiers are, for example, alkyl quaternary ammonium salts, and alkyl quaternary phosphonium salts. Examples of suitable non-ionic emulsifiers are the addition products of 5 to 50 moles of ethylene oxide adducted to straight-chain and branch-chain alkanols with 6 to 22 carbon atoms, or alkylphenols, or higher fatty acids, or higher fatty acid amides, or primary and secondary higher alkyl amines; as well as block copolymers of propylene oxide with ethylene oxide and mixtures thereof. When combinations of emulsifying agents are used, it is advantageous to use a relatively hydrophobic emulsifying agent in combination with a relatively hydrophillic agent, or to use an anionic emulsifying agent in combination with a nonionic agent. The amount of emulsifying agent is generally from about 0.25 to 10%, preferable from about 0.5 to 6% of the monomers used in the polymerisation. Suitable protective colloids include polyvinyl alcohols, ionically modified starches, water-soluble starches, starch ethers, polyacrylic acid, carboxymethyl cellulose, natural gums such as gum arabic, gelatin, casein, synthetic polymers, and water-soluble cellulose ethers such as hydroxyethyl cellulose. In general, these colloids are used at levels of 0.5 to 10% by weight of the monomers used in the polymerisation.

The free radical emulsion polymerization will typically be conducted at a temperature which is within the range of about 30° C. to about 100° C. It is generally preferred for the polymerization to be carried out at a temperature which is with the range of 50° C. to about 90° C. The pressure at which the polymerisation is carried out depends on the nature of the monomers employed. When highly volatile monomer is employed such as e.g. ethylene, superatmospheric pressures, up to e.g. 8000 Kpa, are necessary, otherwise lower pressures or even atmospheric pressures can be employed. The polymerisation is carried out at a pH of from about 1 to about 7, preferably at a pH of from about 3 to about 5. In order to maintain the pH range, it may be useful to work in the presence of customary buffer systems, for example, in the presence of alkali metal carbonates, alkali metal acetates, and alkali metal phosphates. Other ingredients known in the art to be useful for various purposes in emulsion polymerization, such as acids, salts, chain transfer agents, and chelating agents, can be employed.

The polymerisation reaction is generally continued until the residual monomer content is below about 1%.

Step A of the present invention which aims at decreasing the amount of VOC in the polymer latex/dispersion involves the addition of at least one reducing agent in one or more portions to the polymer latex/dispersion. The total amount added lies between 0.02 and 1, preferably between 0.05 and 0.3 wt % calculated on the polymer. Various reducing agents can be used and suitable examples have been identified above. A catalytic amount of transition metal salt is often added with the reducing agent, particularly when the main polymerisation was carried out using a thermal initiating system, but even when the original polymerisation was initiated by a redox couple, it can be advantageous to add an additional quantity of transition metal catalyst.

After the bulk (say at least 60%, rather at least 80%) of the total amount of reducing agent has been added, a roughly equivalent amount of oxidizing agent such as hydrogen peroxide and/or an organic peroxide is added.

This addition is often slowly, continuously or incrementally. The latex/dispersion is kept at a suitable temperature for the rate of polymerisation of the residual monomers to be rapid. In a preferred embodiment of the invention, the temperature during step A is kept between 30 and 100° C., preferably between 45 and 85° C.

According to another embodiment of the invention the reducing agent is completely added before the addition of the oxidizing agent is started. The reaction temperature and reaction time should be sufficient to decrease the VOC level in step A. to below 1,100 ppm, preferably to below 500 ppm, most preferably below 300 ppm.

This practice of sequentially adding reducing agent and then oxidizing agent has been found beneficial in that lower VOC levels can be reached and/or quicker reached than by simultaneous addition of reducing agent and oxidizing agent or reached using lesser quantities of reducing and oxidising agents. It might be that a complex between the transition metal and the reducing agent also plays a role.

In a preferred embodiment of the present invention the free radical generator or oxidizing agent(s) comprises at least one water-soluble peroxy compound and at least one oil-soluble organic peroxide. Preferably the water-soluble peroxy compound comprises a compound from the group comprising hydrogen peroxide, persulphuric acid and/or its alkali or ammonium salt. More preferably the oil-soluble peroxy compound comprises a compound from the group comprising tertiary-butyl hydroperoxide, cumene hydroperoxide, para-menthane hydroperoxide, diisopropylbenzene hydroperoxide, tertiary-butyl perpivalate, benzoyl peroxide or tertiary-butyl peroctoate.

In a preferred embodiment of this invention the polymer latex/dispersion comprises a water-soluble transition metal compound. In case no or not enough transition metal ions are present during the post-polymerization step fresh or more transition metal salt should be added to the latex/dispersion.

It is preferred, but not 100% required, that step B. commences only after the oxidizing agent has been completely added and the post-polymerization step has fully taken place. Reasonable results can be obtained after the bulk (say more than 70%) of the oxidising agent has been added. Some overlap between step A and step B. is possible.

Step B involves feeding water vapour and/or gas (inert gas like nitrogen, carbon dioxide or air) into the latex/dispersion whilst the temperature of the latex/dispersion is maintained at a suitable temperature for a period of time which is sufficient to decrease the VOC-level to the detection level of the gas chromatographic method described below 200 ppm, preferably to below 50 ppm. Feeding water vapour and/or gas through the latex/dispersion can be effected by sparging (bubbling through) this gaseous phase through the liquid latex/dispersion which may still be contained in the reactor or in a subsequent tank. In a preferred embodiment of the present invention step B. is carried out at a temperature between 20 and 90° C., preferably between 60 and 80° C. According to a more preferred embodiment of the invention step B. is carried out at a total pressure of water vapour and/or gas of between 2 and 70 Kpa (absolute), preferably between 20 and 50 Kpa, for example at atmospheric pressure (101.325 Kpa). According to a more preferred embodiment of the invention step B. involves feeding air preferably saturated with water vapour into the latex/dispersion. More in particular it is preferred to feed air saturated with water vapour with a temperature between 10 and 90° C., preferably between 60 and 80° C. into the latex/dispersion. Especially recommended is feeding in air saturated with water vapour having a temperature which is equal to the temperature of the latex/dispersion during step B. This practice prevents loss and accumulation of water in the latex/dispersion and prevents blocking of the equipment.

According to a preferred embodiment of the invention step B. is carried out in a column equipped with internals in which column the latex/dispersion is cascaded downwards in counter-current flow with water vapour and/or air. Internals such as random packing, structured packing and especially trays provide multiple stages of mass transfer and are certainly an advantage. According to more preferred embodiment of the invention the trays of the degassing column are provided with openings having the form of slits. This embodiment is advantageous because it enables the formation of a multitude of small bubbles of gaseous phase passing through the latex/dispersion and ensures a better mass transfer. Preferably the slits have a specific slit surface area of 11 to 25, preferably 12 to 20% calculated on the cross sectional surface area of the column. This ensures better performance of the column. Also the average surface area of the slit is between 80 and 200, preferably 125 to 175 mm². Slots of these dimensions give good performance and are therefore preferred.

According to a preferred embodiment of the invention step B. is carried out in a column equipped with internals in which column the latex/dispersion is cascaded downwards in counter-current flow with water vapour and/or air. Internals such as random packing, structured packing and especially trays provide multiple stages of mass transfer and are certainly an advantage. According to more preferred embodiment of the invention the trays of the degassing column are provided with openings having the form of slits. This embodiment is advantageous because it enables the formation of a multitude of small bubbles of gaseous phase passing through the latex/dispersion and ensures a better mass transfer. Preferably the slits have a specific slit surface area of 11 to 25, preferably 12 to 20% calculated on the cross sectional surface area of the column. This ensures better performance of the column. Also the average surface area of the slit is between 80 and 200, preferably 125 to 175 mm². Slots of these dimensions give good performance and are therefore preferred.

DESCRIPTION OF PREFERRED EMBODIMENTS

The invention will now be illustrated by the following non-limitative examples. All parts and percentages mentioned herein are taken on a weight basis unless otherwise indicated.

Examples

Step A

This illustrates a variety of post polymerisation treatments of an ethylene/vinylacetate (EVA), copolymer at 53.7% solids content, containing approximately 83% vinylacetate (VA) and 17% ethylene (E) in which the polymerisation was carried out to approximately 0.2% by weight residual monomer (vinyl acetate), content. The latex was transferred to a reaction vessel equipped with a reflux condenser, temperature probe and agitator, and heated to 50° C. Initiators and reducing agents were added as dilute aqueous solutions. The reductant solution contained 0.015 parts by weight of latex, of sodium formaldehyde sulphoxylate, (SFS), made up to 0.67 parts by weight with water and contained either 0.119 parts by weight of hydrogen peroxide (HP), or a mixture of 0.060 parts HP+0.157 parts of t-BHP, such that the level of initiator on a molar basis was always constant. Iron was used as ferric chloride, such that the added level of $Fe^{3+}$ was 2.5 ppm based on the weight of latex used, and was added to the initiator. Samples were taken before and 60 minutes after the end of initiator additions, stopped with hydroquinone to prevent further reaction, and analysed by GC (gas chromatography).

Details of the experimental work are tabulated below:

Please note that Experiments (A3), (A5), (A7) and (A8) illustrate step A of the present invention, whereas experiments (A1), (A2), (A4) and (A6) are comparative experiments.

In the table below VAM stands for vinyl acetate monomer, i.e. the bulk of the VOC.

TABLE 1

| | | VAM in concentration ppm | |
|---|---|---|---|
| Expt | Treatment | Before treatment | 60 min after treatment |
| (A1) | HP & SFS solutions added simultaneously over 30 min. | 2069 | 783 |
| (A2) | t-BHP & SFS solutions added simultaneously over 30 min. | 2069 | 1297 |
| (A3) | SFS solution added first, t-BHP solution added over 30 min. | 2298 | 1024 |
| (A4) | t-BHP solution added first, SFS solution added over 30 min. | 2298 | 1888 |
| (A5) | (SFS + $Fe^{3+}$) solution added first, t-BHP solution added over 30 min. | 1876 | 766 |
| (A6) | (t-BHP + $Fe^{3+}$) solution added first, SFS solution added over 30 min. | 1876 | 1852 |
| (A7) | (SFS + $Fe^{3+}$) solution added first, HP solution added over 30 min. | 2201 | 430 |
| (A8) | (SFS + $Fe^{3+}$) solution added first, (t-BHP + HP) solution added over 30 min. | 2201 | 249 |

Experiments (A1) and (A2) and experiments (A5) and (A7) demonstrate that HP is more effective than t-BHP. Experiments (A3) and (A4) demonstrate that, when the solutions are added sequentially, it is more effective to add the reductant first, and comparing experiments (A2) and (A3), it is apparent that a sequential addition with the reductant added first is more effective than adding the solutions simultaneously. Comparing experiment (A5) with experiment (A3) and experiment (A6) with experiments (A4) and (A5) demonstrates that the addition of iron catalyst is beneficial when the reducing agent is added first, but of no benefit when the initiator is added first. Comparing experiment (A8) with experiments (A5) and (A7) demonstrates that the mixture of the water soluble and oil soluble initiators is more effective than either component alone.

Gas Chromatography Methods for Residual Monomer Determination

Residual VOC Method

This method is used to determine the levels of various Volatile Organic Components (components with a boiling point less than or equal to 2-ethylhexyl acrylate. This method uses a direct injection technique onto a capillary gas chromatographic column. The limits of the detection range are from 5 ppm to 20 ppm depending on the component in question. More accurate data and consequently appreciable lower detection levels down to about 0.5 ppm values can be obtained by using headspace GC in combination with mass spectrometry.

Sample Preparation

Approximately 150 μl of sample is placed into a tared autosample vial and weighed in grams (giving the divisor value). This vial is then tared and 1.5 ml of diluent (contains approx. 200 ppm MIBK (methylisobutylketone) as internal retention time standard) is added and again weighed (giving the multiplier value).

Calibration

The system is calibrated by creating calibration curves (at least three points for commonly requested VOC's) using standard dilutions in water.

VOC Result Calculation

The results are expressed in ppm and are derived (automatically via Turbochrom data system) by taking the value directly from the calibration curve, dividing by the sample weight (divisor) and multiplying by the diluent weight (multiplier).

Gas Chromatographic Parameters
Instrument
  Perkin Elmer Autosystem X.L fitted with PPC (Pneumatic Pressure control)
Column
  Perkin Elmer P.E 624,60 meters, 320 µm i.d. and 1.8 µm film thickness.

Channel Parameters:

| | |
|---|---|
| Offset | 5.0 millivolt |
| Delay time | 0.0 mins |
| Run time | 60 mins |
| Sampling rate | 6.25 pts/sec |
| Autosampler Parameters: | |
| Injection volume | 0.5 µl |
| Injection speed | Fast |
| Carrier Gas Parameters: | |
| Carrier gas | $N_2$ |
| Carrier gas ramp | Initial setpoint 82.0 kPa (11.9 psi), hold for 30.0 mins, ramp at 20 kPa/min (3.0 psi/min) to 294 kPa (42.6 psi), hold for 20.0 mins. |
| Detector: | |
| Detector Detection 210° C. | Flame Ionisation |
| $H_2$ Flow | 45.0 ml/min |
| Air Flow | 450 ml/min |

Injector
  Initial set point 180° C., hold for 58.0 mins, ramp at 999 deg/min to 200° C., hold for 36.0 mins
Oven Program
  Initial set point 40° C., hold for 6 mins, ramp at 2.0 deg C./min to 60° C. then ramp at 5.0 deg C./min to 130° C., hold for 6.0 mins then ramp at 5.0 deg C./min to 250° C.
Step B (Method 1)
  A finished batch from Step A prepared as described above was transferred to the stripping vessel at 50 to 65° C. Vacuum was applied to the vessel. When the vacuum reached the level at which the boiling point of water corresponds to the desired stripping temperature, typically 70 to 80° C., the subsurface steam injection was started.
  In the beginning of the steam injection process, the temperature of the latex/dispersion was lower than the boiling point, since the finished batch was generally transferred at approximately 50 to 65° C. Hence, during this phase steam condensed in the latex/dispersion and released its latent heat, and served to elevate the batch temperature.
  When the batch temperature reached the boiling point of water at the obtained pressure, no further temperature rise is noted, and the actual steam stripping was taking place. Steam was injected at a rate so as to maintain a constant temperature in the stripping vessel while vacuum was pulled. The steam was injected at the bottom of the vessel so as to allow contact of the steam with the latex/dispersion as the steam passed up through the liquid. The agitator moved throughout the process. The process was effective in a temperature range of from 50° C., at which the corresponding vapour pressure of water is 12.3 kPa, to 80° C., at which the corresponding vapour pressure of water is 47.4 kPa. Steam injection rates were effective at flow rates or the equivalent thereof, in kilograms per hour, equal to $\frac{1}{30}$ to $\frac{1}{15}$ the batch weight in kilograms or the equivalent thereof, or higher. The vapours given off by the process were directed by pipe work at the top of the column to the tube side of a shell and tube type condenser. The steam injection was carried out for an estimated time period, depending on the initial VOC levels and final required VOC levels of a product, here typically 2 hours, but generally 30 minutes to 3 hours. After an estimated amount of steam had been added, a sample was taken and analysed by gas chromatography to determine levels of VOC's. At the end of the steam injection period, the steam injection was stopped while vacuum was maintained. The batch temperature lowers via vacuum cooling and is approximately 50° C. after about 20 minutes. Final sampling and testing were performed so as to determine the residual level of VOC's. Values were in the range of 5–20 ppm and are tabulated below. Lower values were obtained when steam stripping was prolonged.
  Experiments B1–B3 on the vinyl acetate copolymer aqueous latices/dispersions illustrate the low levels of VOC's in ppm thereby obtained. All monomers are reported as percentage of the weight of the total monomer content.

TABLE 2

| Experiment number, monomer composition, and viscosity | VOC's in feed to stripping vessel (ppm) | VOC's in product from stripping vessel (ppm) |
|---|---|---|
| B1. Ethylene (14%), Vinyl acetate (83%), 2-Ethylhexyl acylate (3%), Viscosity: 4000 [mPa · s] | 638 | 19 |
| B2. Ethylene (9%), Vinyl acetate (91%) Viscosity: 2200 [mPa · s] | 132 | 5 |
| B3. Ethylene (30%), vinyl acetate (70%) Viscosity: 10100 [mPa · S] | 583 | 19 |

Step B (Method 2)
  A finished batch of Step A from a post polymerisation treatment as described above was transferred to an intermediate vessel. From the intermediate vessel the latex/dispersion was transferred via a heating system, to increase the temperature of the latex dispersion to 50 to 80° C., to the top tray of a stripping column. The vacuum in the column was maintained at a level at which the boiling point of the water corresponds to the desired stripping temperature, typically 50 to 80° C.
  The column was equipped with trays with openings having the form of covered slits in which the latex/dispersion was cascaded downwards in countercurrent flow with vapour/steam. The latex/dispersion did not flow across the whole tray like on crossflow trays, but radially from the outer circumference into the centre of the tray or in the opposite direction. This led to better tray hydrodynamics compared to the crossflow trays.
  Underneath the bottom tray of the column vapour/steam was injected so as to allow contact of the vapour/steam with the latex/dispersion as the vapour/steam passed up through pairs of slits on the trays into the next layer of the latex/dispersion. The vapour/steam was diverted by pairs of slits and enters the latex/dispersion froth horizontally. This will reduced entrainment (raining) considerably when compared to trays with openings. Furthermore, more intensive mixing and long contact times of the vapour and the latex/dispersion were obtained when compared to trays with openings.
  The process was most effective at a specific latex/dispersion load of the column in the range of 1–10 $m^3/m^2h$, or higher. The process was effective in a temperature range of from 50° C., at which the corresponding vapour pressure of water is 12.3 kPa, to 80° C. at which the corresponding vapour pressure of water is 47.4 kPa. Steam injection rates were effective at flow rates or the equivalent thereof, in kilograms per hour, equal to $\frac{1}{20}$ to $\frac{1}{10}$ of the latex/dispersion flow into the column, or higher. The vapours given off from the process were directed by pipe work at the top of the column to the tube side of a shell and tube type condenser. Alternatively they can be removed by other means, like catalytic combustion. Final sampling and testing were performed so as to determine the residual level of VOC's. Values in the range of 0–5 ppm were obtained with this technique.

Experiments B4–B7 on the vinyl acetate copolymer aqueous latices/dispersions in accordance with the present invention illustrate the low levels of VOC's in ppm thereby obtained. All monomers are reported as percentage of the weight of the total monomer content.

TABLE 3

| Experiment number, monomer composition, and viscosity | VOC's in feed to column (ppm) | VOC's in product from column (ppm) |
| --- | --- | --- |
| B4. Vinyl acetate (70%), Vinyl versatate (30%) Viscosity: 400 [mPa · s] | 253 | n.d.* |
| B5. Ethylene (9%), Vinyl acetate (91%) Viscosity: 2000 [mPa · s] | 78 | 2 |
| B6. Vinyl acetate (15%), Vinyl versatate (85%) Viscosity: 2000 [mPa · s] | 627 | 5 |
| B7. Vinyl acetate (70%), Vinyl versatate (30%) Viscosity: 400 [mPa · s] | 260 | n.d.* |

*n.d.: non detectable

The products obtained were of excellent quality.

Step B (Method 3)

A finished batch of Step A prepared as described above was transferred to an intermediate vessel. From the intermediate vessel the latex/dispersion was transferred via a heating system, to increase the temperature of the latex dispersion to 50 to 80 degrees Celsius, to the top tray of a stripping column. The pressure in the column was maintained around atmospheric pressure (101.3 kPa).

The column was equipped with trays with openings having the form of slits in which the latex/dispersion was cascaded downwards in countercurrent flow with air saturated with water vapour. The latex/dispersion did not flow across the whole tray like on crossflow trays, but radially from the outer circumference into the centre of the tray or in the opposite direction. This led to better tray hydrodynamics compared to the crossflow trays.

Underneath the bottom tray of the column air saturated with water vapour was injected so as to allow contact of the air with the latex/dispersion as the air passed up through pairs of slits on the trays into the next layer of the latex/dispersion. The air was diverted by pairs of slits and entered the latex/dispersion froth horizontally. This considerably reduced entrainment compared to trays with openings. Furthermore, intensive mixing and long contact times of the air and the latex/dispersion were obtained when compared to trays with openings.

The process was most effective at a specific latex/dispersion load of the column in the range of 1–10 m³/m²h, or higher. The process was effective in a temperature range of from 50 to 80° C. Air saturated with water vapour injection rates are effective at flow rates or the equivalent thereof, in kilograms per hour, equal to 1/15 to 1/5 of the latex/dispersion flow into the column, or higher. The vapours and air given off from the process were directed by pipe work at the top of the column to the tube side of a shell and tube type condenser. Alternatively they are removed by other means, like catalytic combustion.

Final sampling and testing were performed so as to determine the level of residual VOC's. Values in the range of 0–5 ppm have been obtained with this technique.

Experiments B8–B10 on vinyl acetate homopolymer and copolymer aqueous latices/dispersions illustrate the low levels of VOC's in ppm thereby obtained. All monomers are reported as percentage of the weight of the total monomer content.

TABLE 4

| Experiment number, monomer composition, and viscosity | VOC's in feed to column (ppm) | VOC's in product from column (ppm) |
| --- | --- | --- |
| B8. Vinyl acetate (100%) Viscosity: 6000 [mPa · s] | 71 | n.d.* |
| B9. Vinyl acetate (15%), Vinyl versatate (85%) Viscosity: 2000 [mPa · s] | 599 | 5 |
| B10. Vinyl acetate (100%) Viscosity; 6000 [mPa · s] | 67 | n.d.* |

*n.d.: non detectable

The products obtained were of excellent quality.

Experiments AB1 and AB2

These experiments illustrate the combination of post-polymerization treatments (Step A) and a steam stripping process (Step B, Method 1).

In experiment AB1 the reducing agent solution and water-soluble transition metal compound were added simultaneously with the oil-soluble and water-soluble peroxy compounds to an ethylene/vinylacetate (10/90%) copolymer latex/dispersion of 55% solids content. In experiment AB2 the same amounts of the same reducing agent solution and water-soluble transition metal compound were added first, and the same amounts of the same oil-soluble and water-soluble peroxy compounds were added over 30 minutes to a similar ethylene/vinylacetate copolymer latex/dispersion. Samples were taken before and after 60 minutes after the end of the initiator additions; the reaction was stopped by the addition of hydroquinone and analyzed by GC (gas chromatography).

Both batches AB1 and AB2 were transferred to a stripping vessel and treated as described herein before under Step B (Method 1).

Samples were taken after 2 hours and 3 hours after the beginning of the steam injection and analyzed for VOC. The results are tabulated below:

TABLE 5

| Residual VOC's in | Expt. AB1 | Expt. AB2 |
| --- | --- | --- |
| Before initiator additions | (0.81%) 8063 ppm | (0.75%) 7502 ppm |
| 60 minutes after initiator additions | 972 ppm | 95 ppm |
| 2 hours after begin steam stripping | 102 ppm | 9 ppm |
| 3 hours after begin steam stripping | 22 ppm | n.d. | n.d. stands for non-detectable, here below 2 ppm

What is claimed is:

1. A process for treating an aqueous polymer dispersion prepared by polymerizing at least one or more monomeric materials to a degree of conversion of at least 98% comprising the steps of:

A. adding to the polymer dispersion a sufficient amount of at least one reducing agent in one or more portions followed by adding at least one free radical generator in such a way that at least the bulk of the reducing agent has been added before addition of free radical generator is started and maintaining the dispersion at a suitable temperature for a period of time which is sufficient to reduce the VOC-level of the dispersion to below 1,100 ppm after which B. water vapour and/or gas is/are fed into the dispersion whilst the temperature of the dispersion is maintained at a suitable temperature for a period of time which is sufficient to decrease the VOC-level to below 200 ppm.

2. Process according to claim 1, in which the reducing agent is completely added before the addition of the free radical generator is started.

3. Process according to claim 1, in which the free radical generator comprises at least one water-soluble peroxy compound and at least one oil-soluble organic peroxide.

4. Process according to claim 3, in which the water-soluble peroxy compound is selected from the group consisting of hydrogen peroxide, persulphuric acid and/or its alkali or ammonium salt.

5. Process according to claim 3, in which the oil-soluble peroxy compound is selected from the group consisting of tertiary-butyl hydroperoxide, benzoyl peroxide and cumene hydroperoxide.

6. Process according to claim 1, in which the polymer latex dispersion comprises a water-soluble transition metal compound.

7. Process according to claim 1, in which the temperature during step A. is kept between 30 and 100° C.

8. Process according to claim 1, in which the monomeric materials comprise only C, H, O and N atoms.

9. Process according to claim 1, in which the monomeric materials comprise at least 50–100% vinylacetate with ethylene and/or acrylate as comonomers or 0–60% styrene with acrylate or methacrylate as comonomer(s).

10. Process according to claim 1, in which in step B. air saturated with water vapour is fed into the latex dispersion.

11. Process according to claim 1, in which step B. is carried out at a total pressure of water vapour and/or gas of between 2 and 70 kPa (absolute).

12. Process according to claim 1, in which step B. is carried out at a temperature between 20 and 90° C.

13. Process according to claim 1, in which air saturated with water vapour with a temperature between 10 and 90° C. is fed into the latex dispersion.

14. Process according to claim 1, in which step B. is carried out in a column provided with trays with openings in which column the latex dispersion is cascaded downwards in counter-current flow with water vapour and/or air.

15. Process according to claim 14, in which the trays are provided with openings having the form of slits.

16. Process according to claim 14 or 15, in which the openings in the trays are provided with flow directing slots.

17. Process according to claim 16, in which the trays are so designed that the flow of the latex dispersion on the trays follows radial directions.

* * * * *